(12) United States Patent
Moore et al.

(10) Patent No.: US 7,683,275 B2
(45) Date of Patent: Mar. 23, 2010

(54) MINIATURE SWITCH AND BATTERY HOLDER

(75) Inventors: Jerry Moore, Boulder, CO (US); Christian James Moore, Boulder, CO (US)

(73) Assignee: Playhard, Inc., Boulder, CO (US)

( * ) Notice: Subject to any disclaimer, the term of this patent is extended or adjusted under 35 U.S.C. 154(b) by 0 days.

(21) Appl. No.: 11/995,288

(22) PCT Filed: Jul. 14, 2006

(86) PCT No.: PCT/US2006/027692
§ 371 (c)(1),
(2), (4) Date: May 30, 2008

(87) PCT Pub. No.: WO2007/009121
PCT Pub. Date: Jan. 18, 2007

(65) Prior Publication Data
US 2009/0000937 A1    Jan. 1, 2009

Related U.S. Application Data

(60) Provisional application No. 60/699,152, filed on Jul. 14, 2005.

(51) Int. Cl.
*H01H 9/00* (2006.01)
(52) U.S. Cl. ............... 200/17 R; 200/341; 362/208; 362/189; 362/200

(58) Field of Classification Search ........... 200/17 R, 200/329, 341, 310; 362/200, 208, 189, 253, 362/205
See application file for complete search history.

(56) References Cited

U.S. PATENT DOCUMENTS

| | | | |
|---|---|---|---|
| 3,392,275 A | 7/1968 | Henrich | |
| 6,109,762 A * | 8/2000 | Hallgrimsson et al. | 362/200 |
| 6,137,396 A | 10/2000 | Puppo | |
| 6,447,143 B2 * | 9/2002 | Krietzman et al. | 362/200 |
| 6,533,436 B2 * | 3/2003 | Krietzman et al. | 362/200 |
| 2003/0184998 A1 | 10/2003 | Collins | |
| 2003/0206409 A1 | 11/2003 | Parsons et al. | |
| 2004/0136186 A1* | 7/2004 | Hsu | 362/208 |
| 2005/0073833 A1 | 4/2005 | VanderSchuit | |
| 2005/0152138 A1* | 7/2005 | Tatebe | 362/200 |

FOREIGN PATENT DOCUMENTS

| | | |
|---|---|---|
| DE | 1151876 | 7/1963 |
| DE | 10009742 | 8/2001 |
| DE | 20314650 | 11/2003 |
| EP | 1291577 | 3/2003 |

* cited by examiner

*Primary Examiner*—Kyung Lee
(74) *Attorney, Agent, or Firm*—Patton Boggs LLP

(57) ABSTRACT

A miniature switch module includes a battery harness attached to a circuit board. A diaphragm or pushbutton type switch and a battery are sandwiched between the retainer and circuit board.

7 Claims, 2 Drawing Sheets

MINIATURE SWITCH AND BATTERY HOLDER

BACKGROUND OF THE INVENTION

1. Field of the Invention

This invention relates in general to electrical switches, particularly those associated with battery operated devices.

2. Statement of the Problem

As electronic circuitry has shrunk in size, a number of inventors have attempted to develop or improve systems for providing smaller and more compact battery supplies and switches for portable electrical devices. Space is at a premium in these devices and, because switches and replaceable batteries both need to be accessible by the user, these pose a physical limit to reducing the size of the device. One approach to solving the compactness issue employs miniature diaphragm momentary contact switches in lieu of bulkier slide, rotary, pushbutton or toggles switches. This method reduces the physical size of the switch and provides additional utility by allowing multiple actuations of a single switch to control various operating modes of the device. However, the user still requires direct access to the switch, and the switch itself consumes valuable area on both the circuit board and exterior surface of the device.

Another approach replaces one of the battery contacts with an intermediate coil or leaf spring which prevents the battery contact from closing a circuit until sufficient pressure is supplied by means of a sliding or screw driven actuator. Although this method eliminates a traditional switch as a separate component, the actuator mechanism doesn't reduce the weight, bulk, or complexity of the device. In addition, this system is not suitable for reliably producing discrete momentary contact pulses required for modal control of integrated circuitry.

None of the prior art approaches are able to combine both compactness and the ability to access the battery and switch. If such a switch and battery assembly were available, it would make possible a whole new spectrum of miniaturized portable battery-operated devices.

SUMMARY OF THE INVENTION

The invention provides a synergistic solution to the above problem that couples the battery with the advantages of a momentary contact switch in an assembly that occupies less volume and less user contact area than the individual components require in less synergistic solutions. According to the invention, preferably, the mechanical switch element also provides the electrical contact to one of the poles of the battery. Further, preferably, the harness that holds the battery in the module also provides the electrical contact to the other pole of the battery, The invention provides a miniature switch and battery module comprising: a battery harness; and a printed circuit board; the battery harness and printed circuit board arranged to hold a battery between them; and a momentary switch element in electrical contact with the circuit board and located to be activated by compression against the circuit board. Preferably, the momentary switch element is selected from the group consisting of a diaphragm type switch element a push button type switch, a lever arm type switch, and a tactile type switch. Preferably, the momentary switch element is located to be in physical contact with one pole of the at least one battery when the battery is placed between the harness and the circuit board. Preferably, the momentary switch element is located between the battery and the circuit board. Preferably, the module further includes the battery, and the battery harness, the printed circuit board, and the momentary switch element are arranged in a stack so that pressure against one of the battery the harness, the circuit board and the battery, the momentary switch is activated. Preferably, an electronic device is integrated with the module, wherein the electronic device is selected from a light emitting device, a sound emitting device, a timer, a toy, and a game.

The invention also provides a method of operating a momentary switch, the method comprising: stacking a battery harness, a battery, a printed circuit board and the momentary switch; applying pressure to one or more of the battery harness, battery, printed circuit board, and the momentary switch to operate the momentary switch.

The invention also provides an apparatus for the electrical connection of a battery to an electrical circuit comprising at least one battery having two poles, one pole of which is placed in mechanical contact with a diaphragm type switch so that when sufficient mechanical pressure is applied to or through the battery, the switch is actuated.

The invention not only provides it also provides a compact solution to the problem of accessing the switch and battery in a switchable, battery-operated device, but also does this with a sturdy and simple structure Numerous other advantages and features of the invention will become apparent from the following detailed description when read in conjunction with the drawings.

DETAILED DESCRIPTION OF THE PREFERRED EMBODIMENT

Figure 1:
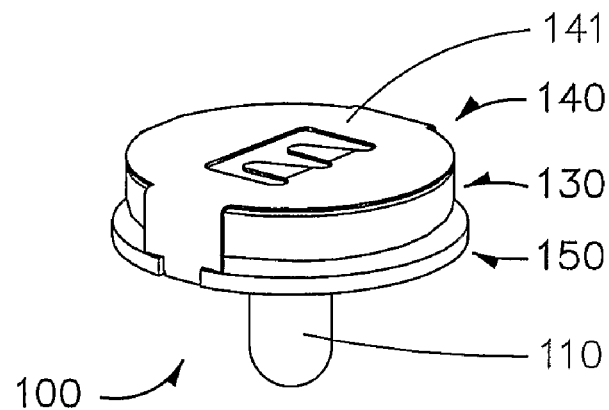
FIG. 1 is an isometric view of a preferred embodiment of the invention.
Figure 2:
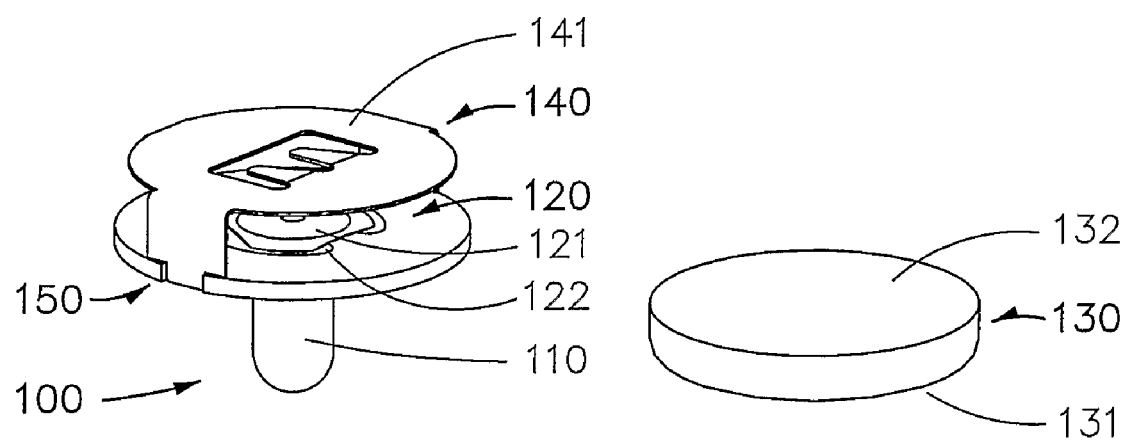
FIG. 2 shows the embodiment of FIG. 1 with the battery removed.
Figure 3:
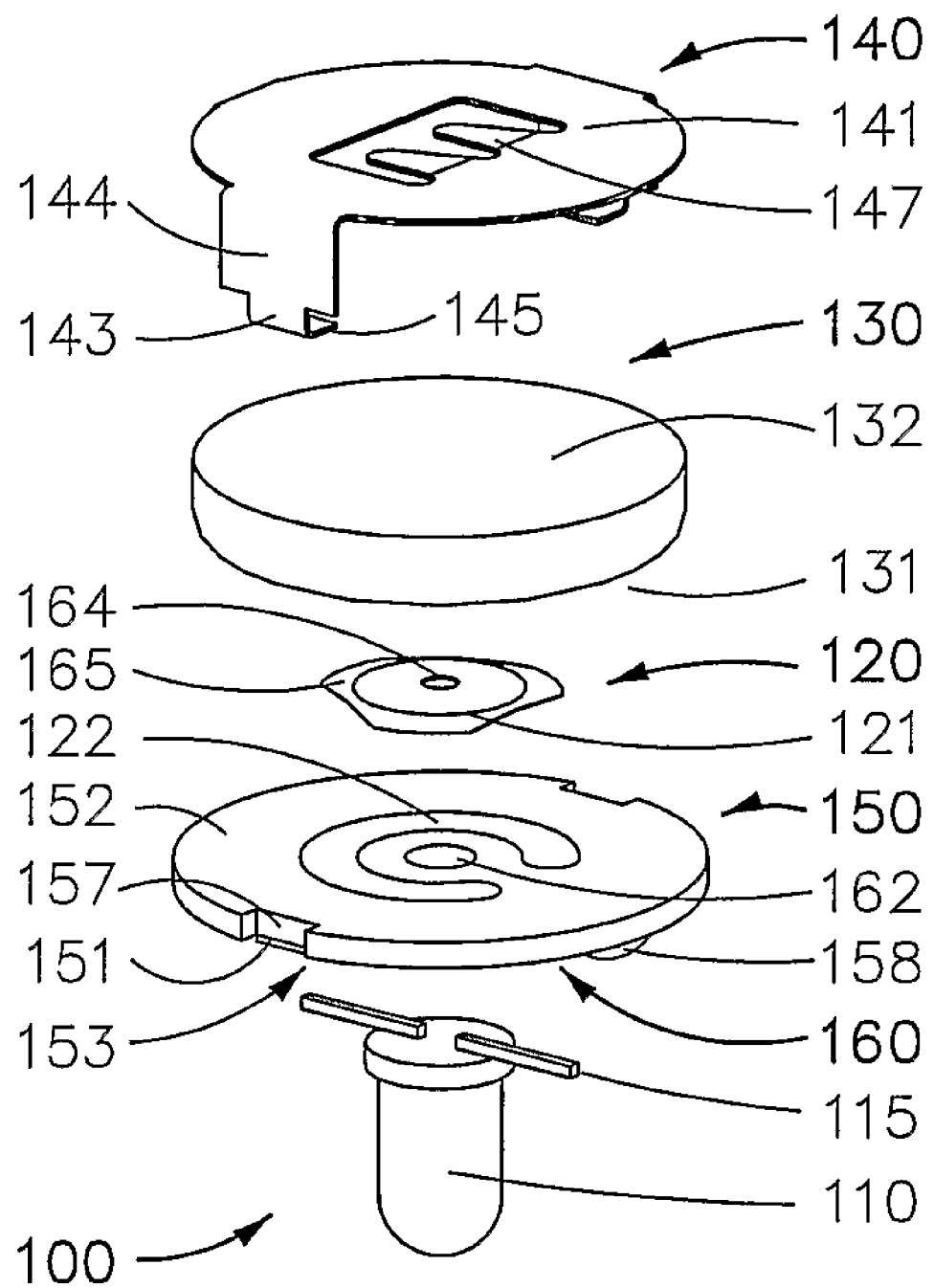
FIG. 3 is an exploded view of the embodiment of FIG. 1 with additional details of the various parts shown.

The preferred embodiment of a switch module 100 according to the invention is shown in FIG. 1. FIG. 2 shows the same module 100 with the battery 130 removed. FIG. 3 shows an exploded view of switch module 100 with additional details of the parts included. Switch module 100 comprises printed circuit board 150, momentary contact switch 120, battery 130, and battery harness 140. In this particular example, module 100 is integrated with a light emitting diode (LED) 110 and functions to control the lighting of the LED.

Printed circuit board 150 is made of conventional printed circuit board materials and includes electrical traces, such as 122, 162 and 151 (FIG. 3) and an integrated circuit chip 158. It preferably is of a shape and size to match the dimensions of 130, which in this case is disk-shaped. Circuit board 150 includes notches 157, the function of which will be discussed below.

Momentary contact switch 120 includes mechanical switch element and battery contact 121, momentary switch contact 162 on printed circuit board 150, and logic included in integrated circuit chip 158. Printed circuit board 150 with bottom face 160 contains an electronic circuit 153 having components associated with the functional performance of the switch and the electronic 110 that is operated by the switch module 100, which, in this case is LED 110. In this example, the circuit 153 controls the level and timing of electrical power provided to light emitting diode 110. The particular circuits for activating and deactivating the momentary switch 120 in response to an electronic pulse and for controlling electronic device 110 are known in the art and will not be discussed in detail herein. The invention contemplates that any such circuit may be used. Mechanical switch element 121 preferably comprises a diaphragm 121 having a first battery and momentary switch contact 164 and circuit contacts 165 which are mounted over and make contact with associated conductor traces 122 on the top face 152 of circuit board 150. A feature of the invention is that the momentary switch element 121 also provides the contact to one of the poles of the battery 130.

Battery 130 is preferably a conventional coin cell battery and preferably has negative pole 131 in contact with diaphragm switch battery contact 164 and positive pole facing toward harness 140. This polarity is selected in this embodiment to cooperate with the voltage required by the logic in integrated circuit chip 158. However, the opposite polarity is also possible with appropriate logic and circuit adaptations.

Battery harness 140 may be any device that stabilizes and holds the battery to the circuit board 150. A feature of the invention is that the preferred battery harness also provides the contact to one of the poles of battery 130. Preferably, battery harness 140 comprises a disk-shaped conductor 141 having die-cut harness battery contacts 147, preferably located near the center of the disk 141. Harness 140 also includes legs 144 which extend around battery 130. Legs 144 each terminate in a flange 143 having an inward bent lip 145. Flange 143 fits into notch 157 in circuit board 150 to locate harness 140 properly with respect to the circuit elements and prevent rotary motion between the harness and circuit board. Lips 145 fits under the bottom edge of circuit board 150 and make contact with traces 151 on the circuit board.

LED 110 includes electrical terminals 115 which connect to circuitry 153 on the underside of circuit board 150.

Harness 140 holds battery 130 securely in place while allowing installation and replacement of battery 130, and also provides contact between circuit 153 and the positive pole 132 of battery 130. It is preferably made of tin coated steel, but be made of steel with other conductive coatings, brass, or other suitable conductive material or non-conductive material with conducting coatings. It must be flexible enough to bend sufficiently when pressed to operate the switch, but sufficiently rigid to firmly hold batter 130. When the battery is inserted, there should be enough tension between the harness, battery and circuit board to hold the battery firmly without sliding, but not so much tension as to activate mechanical switch element 121. The actuating area 141 of harness 140 lies opposite diaphragm 121 and is flexible enough to deflect slightly when pressed by the user. Battery 130 transfers the movement of actuating area 141 to diaphragm 121 which contacts circuit trace 162 and activates switch 120. When the user releases pressure the spring action of diaphragm 121 returns battery 130 and actuating area 141 to their original positions thus deactivating switch 120. However, in this position, switch element/contact 121 continues to function to provide an electrical connection between the negative pole 131 of battery 130 and trace 122. Battery 130 with positive pole 132 and negative pole 131 is mounted in harness 140 and provides electrical power to device 100.

Circuitry 153 including integrated circuit chip 158 is arranged to control the modal state of device 100 when activated. When circuit 153 is off and momentary switch circuit 120 is closed by contact of contact 164 with trace 162, the circuit 153 is activated and, in this case, LED 110 turns on. When circuit 153 is on and momentary switch circuit 120 is closed by contact of contact 164 with trace 162, the circuit 153 is deactivated and, in this case, LED 110 turns off. Similarly if an audio device instead of an LED was integrated with module 100, the audio would turn on when the circuit 153 is activated and turn off when the circuit is deactivated. Similarly, the switch module 100 may be integrated with many other electronic devices. Circuit 153 may also contain elements to control the operation of the integrated electronic device 110. For example, the LED may be a multicolored LED and the circuit 153 would include elements to sequentially turn on the various colors according to a predetermined timing sequence.

Other embodiments of the invention may additionally include some or all of the following features: Larger cylindrical battery sizes and/or multiple batteries arranged in series; Location of the battery/switch on variously sized or shaped printed circuit boards; Placement of the battery/switch assembly remote from the main circuit board of the device which is serves; Arrangement of the battery/switch assembly to operate with user actuation pressure applied to the side of the assembly opposite of the diaphragm in lieu of pressure on the battery harness; Enclosure of the battery/switch assembly in compartments or containers associated with the device which is serves; Integration of discrete components of the battery/switch assembly into a single component, and; Incorporation of flexible membranes which transfer actuation pressure by the user and protect the assembly from contamination by water or debris.

In its various configurations, the invention allows the battery and switch to effectively occupy the same interior volume of space while also freeing up usable area on the circuit board and exterior surface of the device which would otherwise have been devoted to the separate components. Examples of devices which could beneficially employ the invention include, but are not limited to, the following: Remote control transmitters; sound emitting devices; Flashlights; Battery operated toys and games; Miniature lighting devices; Electronic timers, and; Lighted pushbuttons.

A feature of the invention is that in the preferred embodiment of the invention, momentary switch element 12 can be switched from either side of the printed circuit board. As indicated above, it can be activated by pressing on harness 140. It can also be activated by pressing on the integrated electronic element 110, or the circuit board 150. Another feature of the invention is its compact size. The size is largely determined by the battery. In the preferred embodiment, it is 22 mm in diameter and 8 mm thick, including two coin-cell batteries. The thickness, excluding the battery 130 and electronic device 110 is from 2 mm to 8 mm thick, more preferably 3-6 mm thick, and most preferably, 3-4 mm thick.

There has been described a novel compact, modular switch and battery holder. It should be understood that the specific formulations and methods described herein are exemplary and should not be construed to limit the invention, which will be described in the claims below. Further, it is evident that those skilled in the art may now make numerous uses and modifications of the specific embodiments described without departing from the inventive concepts. As one example, one or more batteries may be used. As another example, the elements of the device may be incorporated with a type A, type AA, type AAA, type C or type D battery. The battery will make the module larger, but at the same time the simplicity and compactness of the structure will permit much smaller modules with these types of batteries. For example, a small, push-button flashlight can be made using the principles of the invention.

We claim:

1. A miniature switch and battery module comprising:
a battery harness; and
a printed circuit board;

said battery harness and printed circuit board arranged to hold a battery between them; and a momentary switch element in electrical contact with said circuit board and located to be activated by compression against said circuit board, wherein said momentary switch element is located to be in physical contact with one pole of the at least one battery when said battery is placed between said harness and said circuit board, and said momentary switch element is located between said battery and said circuit board.

2. A miniature switch and battery module as in claim 1 wherein said momentary switch element comprises a diaphragm type switch element.

3. A miniature switch and battery module as in claim 1 wherein said momentary switch element comprises a push button type switch.

4. A miniature switch and battery module as in claim 1 wherein said momentary switch element comprises a lever arm type switch.

5. A miniature switch and battery module as in claim 1 wherein said momentary switch element comprises a tactile type switch.

6. A miniature switch and battery module as in claim 1 and further including an electronic device integrated with said module, wherein said electronic device is selected from a light emitting device, a sound emitting device, a timer, a toy, and a game.

7. A miniature switch and battery module comprising:

a battery harness; and a printed circuit board;

said battery harness and printed circuit board arranged to hold a battery between them; and a momentary switch element in electrical contact with said circuit board and located to be activated by compression against said circuit board, and further including said battery, wherein said battery harness, said printed circuit board, and said momentary switch element are arranged in a stack so that pressure against one of said battery harness, said circuit board and said battery, said momentary switch is activated.

* * * * *